(12) United States Patent
Garnier et al.

(10) Patent No.: US 11,173,366 B2
(45) Date of Patent: Nov. 16, 2021

(54) CAPACITIVE SENSING CLIMBING HOLD, ASSOCIATED PRODUCTION METHOD AND WALL

(71) Applicant: X'SIN, Arnas (FR)

(72) Inventors: Denis Garnier, Blace (FR); Valentin Rul, Narbonne (FR)

(73) Assignee: X'SIN, Arnas (FR)

( * ) Notice: Subject to any disclaimer, the term of this patent is extended or adjusted under 35 U.S.C. 154(b) by 41 days.

(21) Appl. No.: 16/613,052

(22) PCT Filed: May 18, 2018

(86) PCT No.: PCT/EP2018/063063
§ 371 (c)(1),
(2) Date: Nov. 12, 2019

(87) PCT Pub. No.: WO2018/211062
PCT Pub. Date: Nov. 22, 2018

(65) Prior Publication Data
US 2020/0197775 A1    Jun. 25, 2020

(30) Foreign Application Priority Data
May 18, 2017 (FR) ...................... 1754398

(51) Int. Cl.
*A63B 69/00* (2006.01)
*A63B 24/00* (2006.01)
(Continued)

(52) U.S. Cl.
CPC ...... *A63B 69/0048* (2013.01); *A63B 24/0062* (2013.01); *B29B 7/90* (2013.01);
(Continued)

(58) Field of Classification Search
CPC ... A63B 69/0048; B29K 2507/04; C08K 3/04
See application file for complete search history.

(56) References Cited

U.S. PATENT DOCUMENTS 3,966,668 A * 6/1976 Cain ................. C08K 3/04
523/340
4,520,885 A * 6/1985 Jeffrey ................. G01G 3/12
177/21 OC (Continued)

FOREIGN PATENT DOCUMENTS

| DE | 102013002287 B3 | 5/2014 |
| FR | 3006797 A1 | 12/2014 |
| JP | 2001303595 A | 10/2001 |

OTHER PUBLICATIONS

International Search Report issued in PCT Patent Application No. PCT/EP2018/063063 dated Jul. 26, 2018.

*Primary Examiner* — Liam J Heincer
(74) *Attorney, Agent, or Firm* — Marshall, Gerstein & Borun LLP

(57) ABSTRACT

A capacitive sensing climbing hold includes at least one polymer matrix and an anchor point provided in the polymer matrix, the anchor point being configured for attaching the climbing hold to a climbing wall and for transmitting a capacitive contact to a capacitive sensing unit. The polymer matrix includes a carbon powder so that the carbon powder represents between 5% and 35% of the weight of the polymer matrix, preferably between 10% and 35% of the weight of the polymer matrix, the carbon powder being substantially evenly distributed in the polymer matrix.

19 Claims, 3 Drawing Sheets

(51) Int. Cl.
  *B29B 7/90* (2006.01)
  *B29K 67/00* (2006.01)
  *B29K 75/00* (2006.01)
  *B29K 507/04* (2006.01)
(52) U.S. Cl.
  CPC ..... *A63B 2209/00* (2013.01); *A63B 2220/801* (2013.01); *A63B 2220/833* (2013.01); *B29K 2067/00* (2013.01); *B29K 2075/00* (2013.01); *B29K 2507/04* (2013.01)

(56) References Cited

U.S. PATENT DOCUMENTS

| | | | | |
|---|---|---|---|---|
| 6,034,167 | A * | 3/2000 | Tung | C08K 3/04 524/496 |
| 8,803,844 | B1 * | 8/2014 | Green | G06F 3/0445 345/174 |
| 8,808,145 | B1 | 8/2014 | Parsons et al. | |
| 9,305,706 | B2 * | 4/2016 | Almadhoun | H01G 4/008 |
| 9,539,483 | B1 | 1/2017 | Tsang | |
| 2002/0035701 | A1 * | 3/2002 | Casebolt | G06F 3/0317 713/300 |
| 2003/0105214 | A1 * | 6/2003 | Bayer | C08K 3/08 524/495 |
| 2005/0109559 | A1 * | 5/2005 | Eike | A63B 69/0048 182/90 |
| 2005/0154118 | A1 * | 7/2005 | Hayes | C08K 3/04 524/495 |
| 2007/0191188 | A1 * | 8/2007 | Collins | A63B 69/0048 482/35 |
| 2010/0004098 | A1 * | 1/2010 | Hensley | A63B 69/0048 482/37 |
| 2010/0259503 | A1 * | 10/2010 | Yanase | G06F 3/04166 345/174 |
| 2012/0128995 | A1 * | 5/2012 | Leto | D06M 15/63 428/473 |
| 2012/0247572 | A1 * | 10/2012 | Joseph | B67D 7/78 137/15.01 |
| 2012/0319706 | A1 * | 12/2012 | Nadel | G01N 27/22 324/679 |
| 2013/0228037 | A1 * | 9/2013 | Chesner | B62K 21/26 74/551.9 |
| 2014/0167309 | A1 * | 6/2014 | Parola | B29C 45/0046 264/105 |
| 2014/0261750 | A1 * | 9/2014 | Rosko | F16K 21/00 137/78.1 |
| 2015/0073072 | A1 * | 3/2015 | Kim | H01B 3/46 524/106 |
| 2015/0201918 | A1 * | 7/2015 | Kumar | A61B 17/1622 606/104 |
| 2016/0076954 | A1 * | 3/2016 | Bowden | G01L 1/18 73/862.627 |
| 2016/0136496 | A1 * | 5/2016 | Garnier | A63B 71/0605 315/76 |
| 2016/0313194 | A1 * | 10/2016 | Scheffer | G01L 1/142 |
| 2016/0351346 | A1 * | 12/2016 | Naskar | H01G 11/38 |
| 2016/0354670 | A1 * | 12/2016 | Delachanal | A63B 71/0622 |
| 2019/0317632 | A1 * | 10/2019 | Shirai | G09G 3/3648 |
| 2020/0190372 | A1 * | 6/2020 | Kim | C09J 7/30 |
| 2020/0301531 | A1 * | 9/2020 | Kring | B60N 2/0228 |
| 2020/0308379 | A1 * | 10/2020 | Rousseaux | B29C 45/0001 |

* cited by examiner

State of the art

State of the art

CAPACITIVE SENSING CLIMBING HOLD, ASSOCIATED PRODUCTION METHOD AND WALL

TECHNICAL FIELD

The present disclosure relates to the field of climbing holds as well as the processes for making climbing holds and the associated walls.

The disclosure more particularly relates to climbing holds adapted to perform capacitive detection of climbers.

BACKGROUND OF THE DISCLOSURE

Climbing holds are conventionally made by flowing a polyester or polyurethane resin in silicone molds. Polyurethane is obtained by combining an isocyanate and an alcohol. Polyester can be mixed with silica to obtain an improved hold that is more resistant to clamping forces. When the liquid preparation is obtained, a catalyst is added to the preparation to achieve the hardening of the liquid preparation. Before the liquid preparation completely hard, the liquid preparation is flowed into a silicone mold.

A conventional climbing wall is made of resin-coated and sandblasted wooden boards on which holds are fixed by means of an anchor point. This anchor point can be simply a wood screw, passing through the hold, and screwed into the wall. Preferably, the anchor point corresponds to a screw/insert threaded system with a socket head screw. The screw head is inserted into a hold cavity while the screw body extends through a recess in the hold and wall so that it opens on the other side of the wall and is fixed by an insert-like nut embedded in the back of the wall.

With this screw/nut system, an electrical current applied to the nut can pass through the hold and wall to be picked up at the screw head. It is therefore possible to carry out a capacitive detection of a climber.

Capacitive detection is based on the fact that the human body is conductive. As shown in FIG. 1, the body of the climber (13) acts as an electrode that comes in front of another electrode (12) attached to an acquisition circuit by the nut. The acquisition circuit simply comprises an input terminal (10) and an output terminal (11) connected by a resistor (R). The nut is connected between the resistance (R) and the output terminal (11). The connection of the nut with the acquisition circuit forms a first residual capacitance (Cpin).

To detect the contact of the climber (13), a low current is emitted by the input terminal (10) and this low current is transmitted to the nut and then to the climbing hold via the screw. If the climber touches the hold, a second residual capacitance (Csensed) is created by the body of the climber, thus forming an RC circuit inducing a discharge of the body of the climber into the acquisition circuit. This discharge can be detected on the output terminal (11).

In a capacitive sensing climbing wall, each hold is connected to a specific acquisition circuit and it is possible to identify the hold(s) touched by the climber over time. This technology improves the analysis of climbers' performance, especially for speed competitions.

This technology is known from the French patent application No. FR 3006797 and the American U.S. Pat. No. 8,808,145.

The problem with this technology is the detection of the climber. Indeed, as shown in FIG. 2, the detection of the climber is homogeneous over a generally circular half-sphere around the screw head (15) in the air. A first circle (16) illustrates the area of the hold (14) wherein detection is optimal. In the second circle (17) the current induced by the detection is lower when passing through the first circle (16). In the third circle (18) the current induced by the detection is again lower and, beyond this third circle (18) the climber (13) is no longer detectable.

Thus, the technical problem of the disclosure is to improve the capacitive detection of climbing holds. However, this improvement must not be at the expense of the touch of the climbing holds, which are designed to reproduce the contact of a natural rock.

SUMMARY OF THE DISCLOSURE

The present disclosed embodiments proposes to solve this technical problem by integrating conductive particles into the polymeric matrix of the climbing hold.

According to a first aspect, an embodiment relates to a capacitive sensing climbing hold comprising:
  at least one polymeric matrix; and
  an anchor point provided in said polymeric matrix, said anchor point being configured to fix said climbing hold on a climbing wall and to transmit a capacitive contact to a capacitive sensing assembly.

In embodiments said polymeric matrix incorporates a carbon powder so that said carbon powder represents between 5% and 35% of the weight of said polymeric matrix and preferably between 10% and 35% of the weight of said polymeric matrix, said carbon powder being substantially evenly distributed in said polymeric matrix.

The disclosed embodiments allow to obtain a climbing hold whose capacitive detection is carried out on a larger surface than the existing holds since the electrical charges can be transmitted into the climbing hold using an antistatic network formed by the carbon powder.

The integration of conductive particles into a climbing hold is particularly counter-intuitive since the conductive particles are traditionally made by metallic elements in powder or fiber form. However, the metal fibers embedded in a climbing hold increase the risk of cuts since they appear on the surface, hence degrading the user experience.

Additionally, the skilled climber knows that the vast majority of metal powders have high densities that are difficult to integrate into a polymeric matrix of a climbing hold.

For example, with very dense metal powders, i.e. over 3.5 $g/cm^3$, the incorporation of the metal powder into the polymeric matrix forms an inhomogeneous mixture due to the sediment load.

These technical issues have been overcome by using a carbon powder as a conductive feature. Although having a lower conductivity than metallic conductive materials (silver, copper, gold, aluminum, zinc, nickel, iron, tin, platinum, palladium, lead), the low density of the carbon, generally less than 2.3 $g/cm^3$, allowed the formation of a homogeneous mixture with the polymeric matrix.

The tests conducted demonstrated that, for a very low carbon mass compared to the total mass of the climbing hold body, i.e. less than 5%, capacitive detection is only slightly affected since the carbon particles are not sufficient to create an antistatic network in the climbing hold. Additionally, for a very large mass, i.e. greater than 35%, the viscosity of the mixture becomes too high for it to be compatible with the free casting process.

The disclosed embodiments therefore revealed a ratio, between 5% and 35% and preferably between 10% and 35%, wherein the carbon powder improves the properties of capacitive transmissions without significantly degrading the mechanical strength of the climbing hold.

According to the disclosed embodiments, the feature whereby the carbon powder is substantially evenly distributed in said polymeric matrix indicates that, for a hold consisting of a single polymeric matrix, each elementary volume of the hold, with a volume of 1 cm$^3$, contains at least half of the proportion of carbon powder provided for in the hold: between 5% and 35% by weight and preferably between 10% and 35% by weight. Therefore, each elementary volume of the hold contains at least 2.5% carbon powder and preferably at least 5% carbon powder. This feature ensures the continuity of the antistatic network in the hold.

Additionally, climbing holds can be sold with or without the attaching means. Generally, the attaching means comprise a screw passing through a bore in the climbing hold. In this case, the climbing hold has a cavity intended to contain the screw head in the climbing hold.

Alternatively, the climbing hold can be over-molded on the screw. In this case, the weight ratios of the polymeric matrix are to be considered by removing the weight of the screw relative to the weight of the climbing hold.

Alternatively, said climbing hold comprises two polymeric matrices, at least one polymeric matrix incorporating a carbon powder so that said carbon powder represents between 5% and 35% of the weight of said polymeric matrix, and preferably between 10% and 35% of the weight of said polymeric matrix. This embodiment applies to bi-material holds. In this case, the weight ratios of the carbon powder relative to the polymeric matrix integrating the carbon powder must be isolated from the two materials.

According to an embodiment, said carbon powder corresponds to highly structured carbon black. The tests showed that highly structured carbon black is particularly effective in ensuring homogeneity of the mixture between the carbon powder and the polymeric matrix.

According to an embodiment, said carbon powder corresponds to graphite powder. The tests also showed that graphite powder is particularly effective in ensuring the homogeneity of the mixture between the carbon powder and the polymeric matrix.

According to an embodiment, said polymeric matrix integrates a silica powder. The use of silica in a climbing hold increases the mechanical resistance to shocks of the climbing hold when tightening the climbing hold on a climbing wall. The tests demonstrated that silica powder has a negligible influence on the detection signal since silica does not cause discontinuity in the antistatic network formed by the carbon elements.

According to an embodiment, said polymeric matrix integrates between 5% and 35% by weight of carbon powder, preferably between 20% and 30% by weight of carbon powder, and between 20% and 60% by weight of silica, preferably between 40% and 60% by weight of silica. The tests demonstrated that this ratio between carbon powder, silica and the weight of the climbing hold was particularly effective in ensuring the homogeneity of the mixture to implement the climbing hold.

According to a second aspect, the embodiments relate to a method for manufacturing a capacitive sensing climbing hold comprising the following successive steps:
preparation of a polymeric resin;
incorporation of a carbon powder representing between 5% and 35% by weight of said polymeric resin, and preferably between 10% and 35% by weight of said polymeric resin;
agitating the mixture integrating said polymeric resin and carbon powder;
placing the mixture under a vacuum bell so as to degas the mixture;
adding a catalyst to the mixture before or after the agitating step; and
molding the mixture so as to form said climbing hold.

Unlike the manufacture of a conventional climbing hold, the addition of carbon powder requires agitating the polymer resin and the carbon powder in order to ensure homogeneity of the mixture. This agitating step induces the formation of air bubbles in the mixture and, contrary to the state of the art, an additional degassing step is required to extract these air bubbles and obtain a climbing hold with good mechanical resistance.

To achieve a bi-material hold by incorporating a polymeric resin with carbon powder, three different variants are disclosed.

In a first variant, the method involves the following additional steps:
preparing a second polymeric resin without antistatic properties;
adding a catalyst to the second polymeric resin; and
molding said second polymeric resin during the molding step of the mixture so as to form a marbled climbing hold.

This first variant makes it possible to obtain a marbled bi-material hold, i.e. with two materials mixed together during the molding process. The filled polymer resin provides capacitive detection when in contact with the climber's hand or foot, while the unfilled polymer resin is of a different color to give a specific aesthetic result.

In a second variant, the method involves the following additional steps:
preparing a second polymeric resin without antistatic properties;
adding a catalyst to the second polymeric resin; and
molding said second polymeric resin before or after the molding step of the mixture.

This second variant makes it possible to obtain a bi-material hold with two different material thicknesses. The thickness of the filled polymeric resin ensures capacitive detection when in contact with the climber's hand or foot, while the unfilled polymeric resin is of a different color to give a specific aesthetic result.

In a third variant, the method involves the following additional steps:
applying a back mold before the molding step of the mixture so as to form a cavity in said climbing hold;
preparing a second polymeric resin without antistatic properties;
adding a catalyst to the second polymeric resin; and
molding said second polymeric resin in said cavity created by the application of the back mold.

This third variant makes it possible to obtain a bi-material hold with a skin formed by the mixture between the first resin and the carbon powder intended to come into contact with the hand or foot of the climber while the center of the hold incorporates a second resin without antistatic properties.

According to an embodiment, the step of incorporating the said carbon powder involves the addition of a dispersing agent. This embodiment aims to improve the distribution of carbon powder in the mixture.

According to an embodiment, the preparation stage of a polymeric resin involves the addition of silica.

This embodiment increases the mechanical resistance of the climbing hold when tightening the climbing hold on a climbing wall.

According to the embodiment, the agitating step is carried out at a speed of between 10 m/s and 20 m/s. This speed corresponds to the speed of movement of the mixture. The agitating can be carried out by a reciprocating movement with a tool movement speed of between 10 m/s and 20 m/s. Alternatively, the agitating can be carried out by a circular movement using a tool immersed in the mixture, this linear speed then corresponds to the speed of the end of the blades of the tool. This embodiment guarantees an efficient dispersion of the carbon powder in the mixture.

According to an embodiment, said polymeric resin corresponds to a polyester matrix.

According to an embodiment, said polymeric resin corresponds to a polyurethane matrix.

According to a third aspect, the disclosure relates to a connected climbing wall comprising:
climbing holds according to the first aspect, and
a capacitive detection system connected to each hold and configured to detect the contact of a climber on each hold.

BRIEF DESCRIPTION OF THE FIGURES

The way of implementing the disclosed embodiments and the advantages resulting therefrom shall be apparent from the following embodiment, given as a non-limiting example, in support of the annexed Figures wherein

FIG. 1: a schematic representation of the electrical schematic diagram of the capacitive detection of a climbing hold of the state of the art;

FIG. 2: a front view of a climbing hold with capacitive detection of the state of the art;

FIG. 3: a front view of a climbing hold with capacitive detection;

FIG. 4: a schematic representation of the evolution of the detection rate of the hold in FIG. 3 based on the percentage of conductive particles; and FIG. 5: a flowchart of the steps involved in manufacturing the hold in FIG. 3.

DETAILED DESCRIPTION

This section describes a climbing hold the body of which has a single polymeric matrix but more polymeric matrices can be used without departing from contemplated embodiments.

Figure 1:
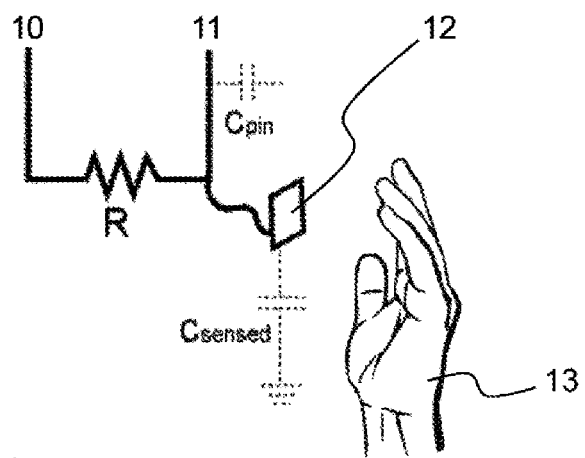
FIGS. 1 to 5 represent.
Figure 2:
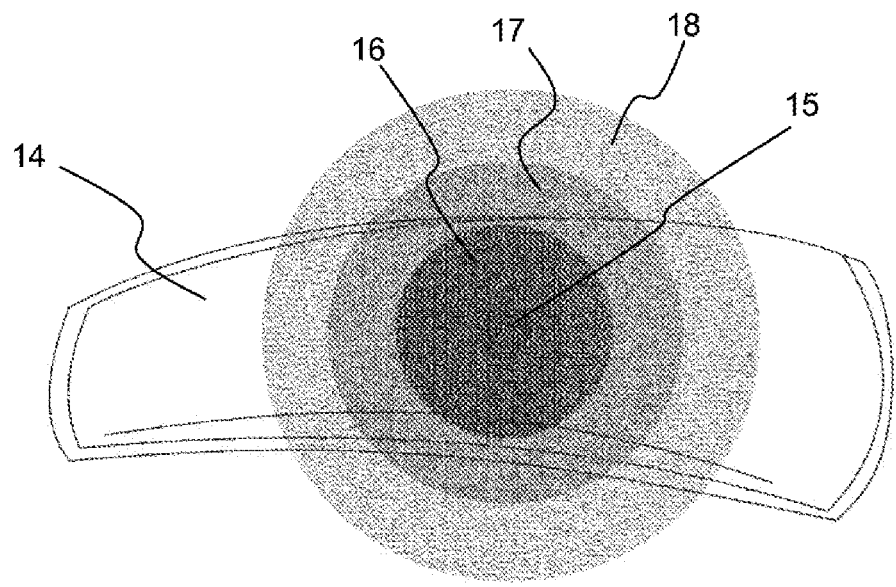
Figure 3:
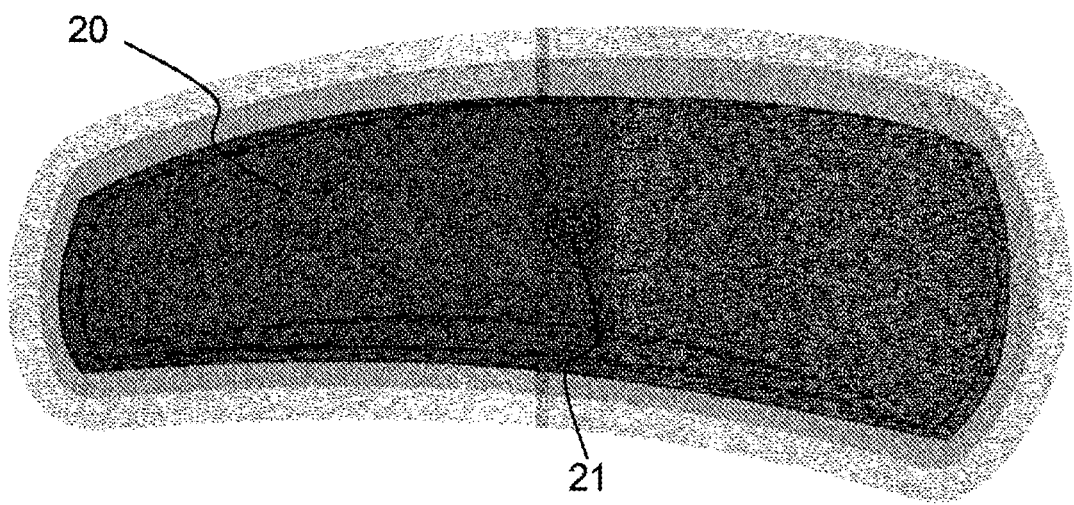

FIG. 3 illustrates a capacitive sensing climbing hold 20 according to an embodiment. The climbing hold 20 is attached to a wall with a socket head screw 21. To do this, the screw head 21 is integrated into a hold 20 cavity and the screw body 21 passes through a recess in the body of the climbing hold 20.

The screw 21 is fixed on a climbing wall by a nut connected to an acquisition circuit similar to those of the state of the art. The body of the climbing hold 20 comprises a polymeric matrix 22 and a conductive powder 23. The conductive powder 23 corresponds to a carbon powder, such as highly structured carbon black or graphite powder. For example, graphite powder from the company Inoxia Ltd® can be used.

The polymeric matrix 22 can be a polyester, polyurethane or any other compatible resin matrix. For example, a polyester matrix PO 820 of the brand Polyprocess can be used.

Figure 4:
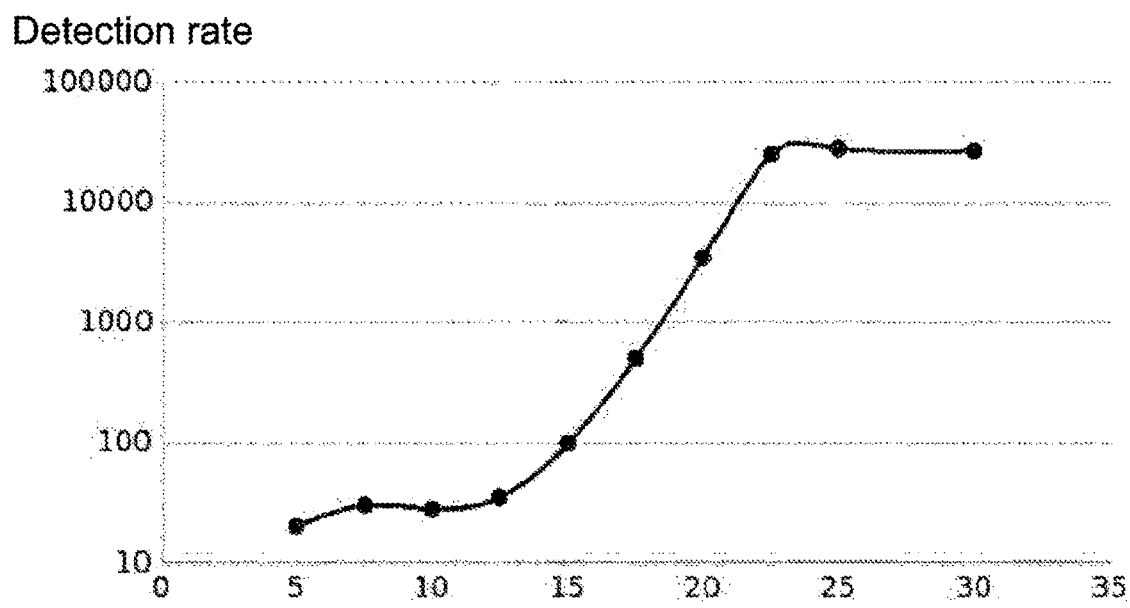

The proportion of the conductive particles 23 is particularly sensitive to transmit electrostatic charges from the climber to the acquisition circuit. FIG. 4 illustrates the detection rate based on the percentage by weight of the conductive particles 23 for a climbing hold 20 with a polyester matrix associated with graphite powder. The improvement of the climber's detection is based on the ratio of 5% of the weight of the climbing hold 20 and stabilizes after a ratio of 25%.

As shown in FIG. 3, for a climbing hold integrating 25% graphite powder, 50% silica and a polyester matrix and preferably 30% silica, the detection of the climber is homogeneous over the entire hold 20 revealing that the carbon powder 23 is particularly effective in transmitting electrostatic charges from the climber to the acquisition circuit.

Figure 5:
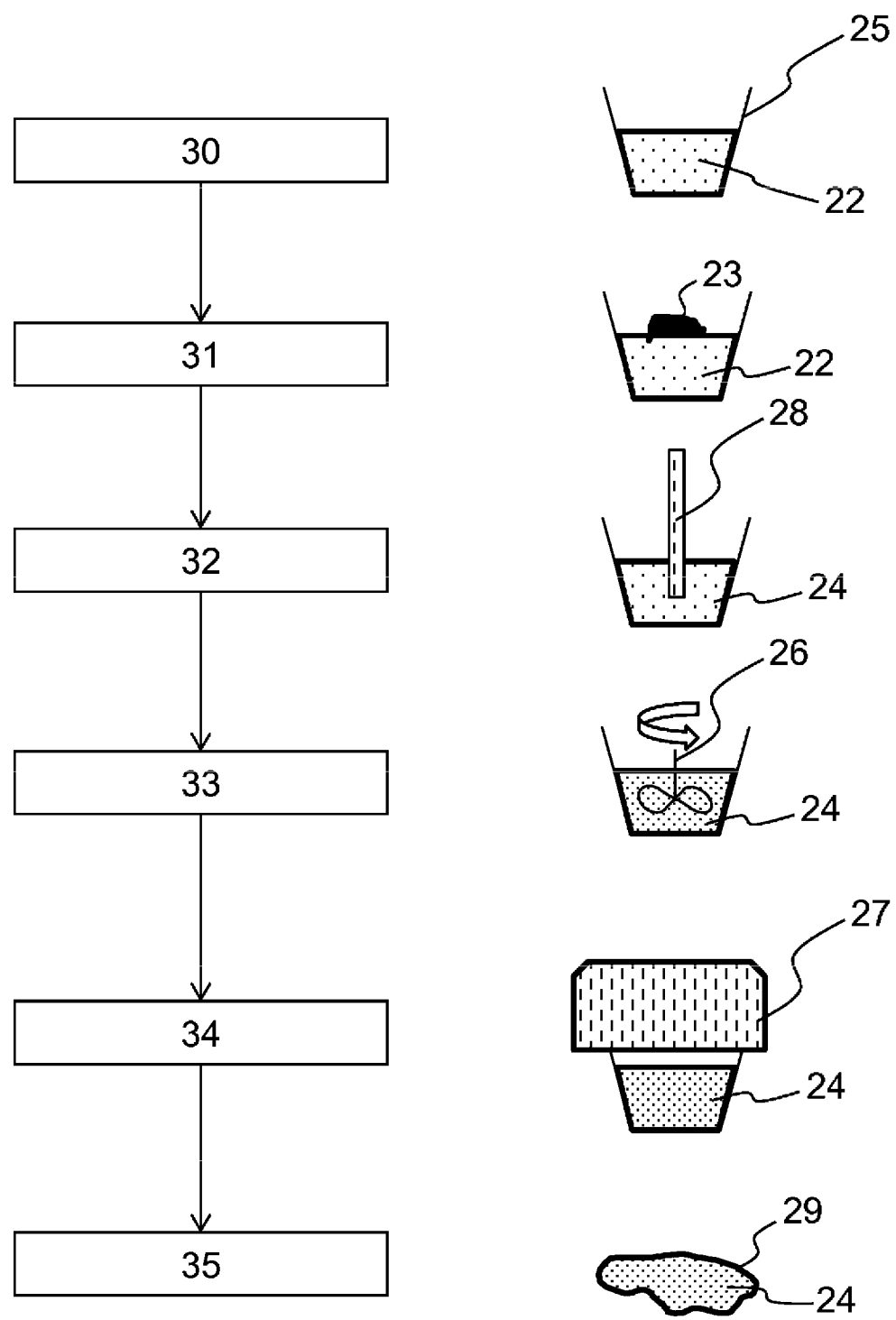

Such climbing hold 20 is achieved by the method described in FIG. 5. The first step 30 is to formulate the polymeric matrix 22. Preferably, the polymeric matrix 22 is formulated in a container 25 from a polyester or polyurethane resin. Polyurethane is obtained by combining an isocyanate and an alcohol. Polyester can be mixed with silica for an improved hold 20 that is more resistant to clamping forces.

When the polymeric matrix 22 is obtained, in a second step 31, a carbon powder 23 is incorporated into the polymeric matrix 22. The weight of the carbon powder 23 is determined according to the desired properties but the weight of the carbon powder 23 must be between 5% and 35% by weight of the assembly formed by the polymeric matrix 22 and the carbon powder 23, and preferably between 10% and 35% of the weight of the assembly. In addition to carbon powder 23, a dispersing agent can be incorporated into the polymeric matrix 22 to improve the distribution of the carbon powder. The dispersing agent may correspond to the product BYK-W 969 of the BYK brand and the proportion of the dispersing agent can be chosen between 0% and 20% of the weight of the polymeric matrix 22.

The carbon powder 23 is then mixed with the polymeric matrix 22 in a third step 32. The agitating can be carried out by a mixer 26 driven by a rotational movement inducing a linear displacement between 10 m/s and 20 m/s at the end of the blades of the mixer 26. For example, a 5-minute agitating can allow a good distribution of the carbon powder 23 in the polymeric matrix 22.

At this stage, the mixture substantially represents the weight of the climbing hold 20. In the case of a polyester matrix, the mixture 24 can integrate between 5% and 35% by weight of carbon powder 23, preferably between 20% and 30% by weight of carbon powder 23, and between 20% and 60% by weight of silica, preferably between 40% and 60% by weight of silica.

In a fourth step 33, to extract the air bubbles, the mixture 24 obtained is placed under a vacuum bell 27. A catalyst 28 is then added, in a fifth step 34, to mixture 24 to achieve the hardening of the mixture 24. Before the mixture 24 is completely hard, the mixture 24 is poured into a silicone mold 29 in a sixth step 35. Alternatively, the catalyst 28 can be integrated into the mixture 24 before agitating 33 and degassing 34.

The mixture 24 sets in the mold to form a climbing hold 20 as shown in FIG. 3. In this solidification step, a metal screw 21 can be inserted into the mixture or the shape of the mold can be adapted to form a cavity and recess for positioning the screw 21.

Then, a set of holds 20 can be used to form a capacitive sensing climbing wall by connecting each screw 21 of each hold 20 with a capacitive sensing assembly capable of detecting the contact of a climber on each hold 20.

The disclosed embodiments improve the detection of a climber's contact at any point on the surface of a hold 20 since the carbon particles in the hold 20 form an antistatic network that transmits a low current. Indeed, when two carbon particles are close together, an electrostatic current can be transmitted between the two particles through a tunnel effect. As a result, the disclosed embodiments make it possible to improve the detection of a climber on a climbing hold with capacitive detection.

The invention claimed is:

1. A capacitive sensing climbing hold comprising:
   at least one polymeric matrix;
   a polymeric resin without antistatic properties, said polymeric resin having added thereto a catalyst; and
   an anchor point provided in said polymeric matrix, said anchor point being configured to attach said climbing hold on a climbing wall and to transmit a capacitive contact to a capacitive detection assembly;
   wherein said polymeric matrix integrates a carbon powder so that said carbon powder represents between 5% and 35% of the weight of said polymeric matrix, said carbon powder being distributed substantially evenly in said polymeric matrix, and
   wherein the at least one polymeric matrix and the polymeric resin cooperate to form marbling in the climbing hold.

2. A capacitive sensing climbing hold according to claim 1, wherein said climbing hold comprises two polymeric matrices, at least one polymeric matrix incorporating a carbon powder so that said carbon powder represents between 5% and 35% of the weight of said polymeric matrix.

3. A capacitive sensing climbing hold according to claim 2, wherein the carbon powder represents between 10% and 35% of the weight of said polymeric matrix.

4. A capacitive sensing climbing hold according to claim 1, wherein said carbon powder corresponds to high structure carbon black.

5. A capacitive sensing climbing hold according to claim 1, wherein said carbon powder corresponds to graphite powder.

6. A capacitive sensing climbing hold according to claim 1, wherein said polymeric matrix integrates a silica powder.

7. A capacitive sensing climbing hold according to claim 6, wherein said polymeric matrix integrates between 5% and 35% by weight of carbon powder, and between 20% and 60% by weight of silica.

8. A capacitive sensing climbing hold according to claim 7, wherein the polymeric matrix integrates between 20% and 30% by weight of carbon powder, and between 40% and 60% by weight of silica.

9. A connected climbing wall comprising:
   climbing holds according to claim 1, and
   a capacitive detection assembly connected to each hold and configured to detect the contact of a climber on each hold.

10. A capacitive sensing climbing hold according to claim 1, wherein the carbon powder represents between 10% and 35% of the weight of said polymeric matrix.

11. A method of manufacturing a climbing hold with capacitive detection comprising the following successive steps:
    preparing a polymeric resin;
    incorporating a carbon powder representing between 5% and 35% of the weight of said polymeric resin;
    agitating the mixture integrating said polymeric resin and carbon powder;
    placing the mixture under a vacuum bell so as to degas the mixture;
    adding a catalyst to the mixture before or after the agitating step of the mixture;
    molding the mixture so as to form said climbing hold;
    preparation of a second polymeric resin without antistatic properties;
    adding a catalyst to the second polymeric resin; and
    molding said second polymeric resin during the molding step of the mixture to form a marbled climbing hold.

12. A method of manufacturing a capacitive sensing climbing hold according to claim 11 comprising the following additional steps:
    preparing a second polymeric resin without antistatic properties;
    adding a catalyst to the second polymeric resin; and
    molding said second polymeric resin before or after the molding step of the mixture.

13. A method of manufacturing a capacitive sensing climbing hold according to claim 11 comprising the following additional steps:
    applying a back mold before the molding step of the mixture so as to form a cavity in said climbing hold;
    preparing a second polymeric resin without antistatic properties;
    adding a catalyst to the second polymeric resin; and
    molding said second polymeric resin in said cavity created by the application of the back mold.

14. A method of manufacturing a capacitive sensing climbing hold according to claim 11, wherein the step of incorporating said carbon powder comprises adding a dispersing agent into said polymer resin.

15. A method of manufacturing a capacitive sensing climbing hold according to claim 11, wherein the step of preparing a polymeric resin comprises adding silica.

16. A method of manufacturing a capacitive sensing climbing hold according claim 11, wherein the agitating step of the mixture is carried out at a speed of between 10 m/s and 20 m/s.

17. A method of manufacturing a capacitive sensing climbing hold according to claim 11, wherein said polymeric resin corresponds to a polyester matrix.

18. A method of manufacturing a capacitive sensing climbing hold according to claim 11, wherein said polymeric resin corresponds to a polyurethane matrix.

19. A method according to claim 11, wherein the carbon powder represents between 10% and 35% of the weight of said polymeric resin.

* * * * *